(12) United States Patent
Buschmann

(10) Patent No.: US 8,118,501 B2
(45) Date of Patent: Feb. 21, 2012

(54) DEVICE WITH A COVER UNIT TO PROTECT A CAMERA UNIT

(75) Inventor: Gerd Buschmann, Velbert (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 2 days.

(21) Appl. No.: 12/702,990

(22) Filed: Feb. 9, 2010

(65) Prior Publication Data

US 2010/0209096 A1 Aug. 19, 2010

(30) Foreign Application Priority Data

Feb. 10, 2009 (DE) .................. 10 2009 008 283

(51) Int. Cl.
G03B 17/00 (2006.01)
H04N 7/00 (2011.01)
H04N 5/225 (2006.01)

(52) U.S. Cl. ........ 396/448; 396/427; 396/429; 348/118; 348/373

(58) Field of Classification Search .................. 396/448, 396/427, 429, 433, 452; 348/118, 373, 837
See application file for complete search history.

(56) References Cited

U.S. PATENT DOCUMENTS 6,382,847 B1 * 5/2002 Takada ..................... 396/452

FOREIGN PATENT DOCUMENTS

| AT | 259363 | 2/2004 |
| DE | 8900426.4 | 5/1989 |
| DE | 69918032 | 6/2005 |

* cited by examiner

*Primary Examiner* — Rochelle-Ann J Blackman
(74) *Attorney, Agent, or Firm* — Cantor Colburn LLP

(57) ABSTRACT

A device with a camera unit, and an operational procedure for the device, where the device has a lens for taking pictures of the area outside of a motor vehicle and a cover unit that can change by means of a drive from a closed position to an open position and vice versa, where the cover unit covers the lens of the camera unit in the closed position and uncovers the lens in the open position making it possible to take a picture, and where the cover unit has a lens cover that is movable on one side by means of a bearing shaft on the device.

15 Claims, 4 Drawing Sheets

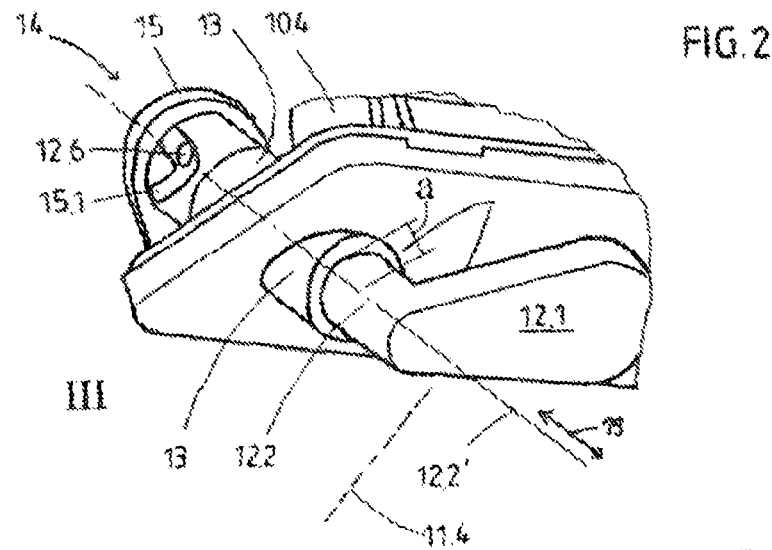
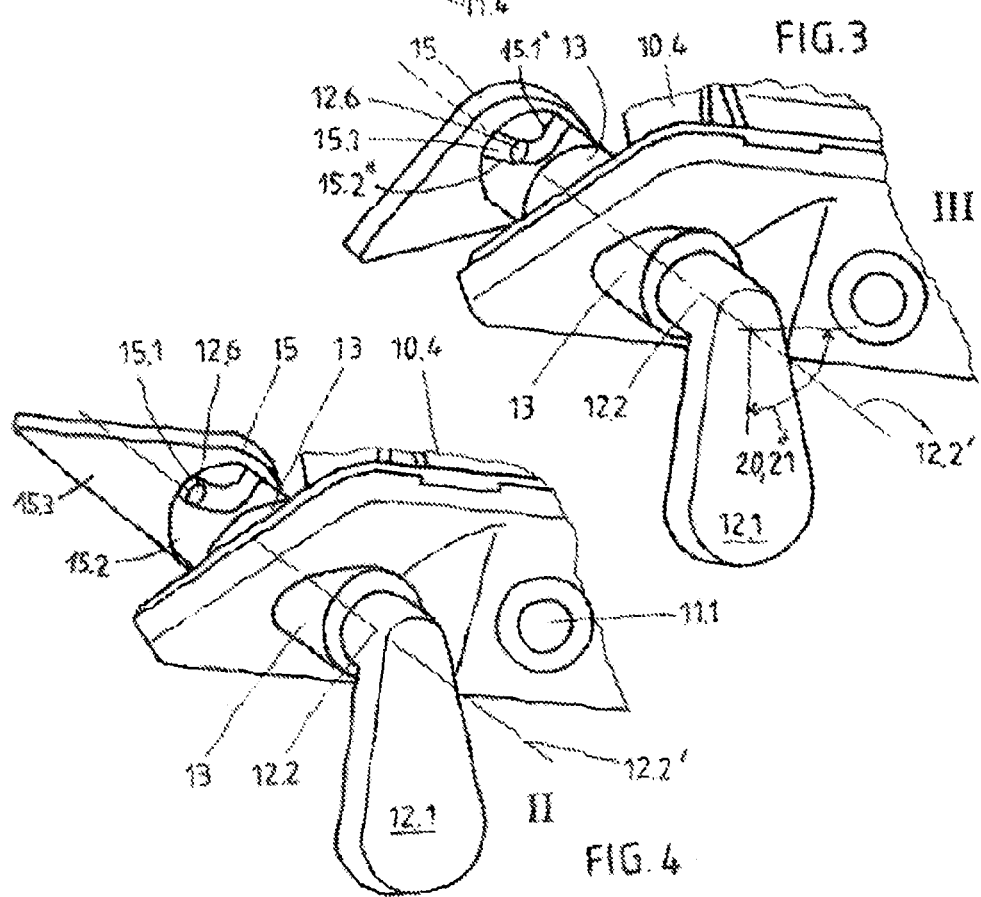

DEVICE WITH A COVER UNIT TO PROTECT A CAMERA UNIT

TECHNICAL FIELD

The disclosure concerns a device with a camera unit that has a lens for taking pictures of the area outside of a motor vehicle and a cover unit that can change by means of a drive from a closed position I to an open position II and vice versa, where the cover unit covers the lens of the camera unit in the closed position I and uncovers the lens in the open position II making it possible to take a picture, and where the cover unit has a lens cover that is movable on one side by means of a bearing shaft on the device.

BACKGROUND

Such types of devices serve for the retention and protection of the camera unit so that it is protected from environmental influences outside the motor vehicle. Numerous embodiment variants exist in which the camera unit is arranged in the device, e.g. even swiveling, and the cover can change additionally or by the camera unit from its closed position to its open position.

In the following we will not distinguish between the objective and the lens of a camera unit. Rather, the two concepts should be understood as synonymous even if clear technical differences exist.

As an example, document DE 699 18 032 T2 is known from the prior art, in which a closing mechanism is able to close the lens of the camera unit by a turning and swiveling motion. For this purpose the lens cover is connected on the left and right with a turn plate that has an eccentric shaft. Consequently, the lens cover is driven to the left and right side by the corresponding closing mechanism. This closing mechanism has a complex construction for which there must be appropriate space.

From another document, DE 60 2004 003 255 T2, a rearview device for a motor vehicle is known, wherein the lens of the camera is likewise closed by a lens cover. This is pulled over the lens of the objective in the form of an arch. The lens cover is operated for this purpose by only a jointed arm. This device has the disadvantage, however, that the objective or the lens of the objective can be easily scratched by the inside of the lens cover if dirt gets between these two parts. This operating mechanism also has a complex construction.

BRIEF SUMMARY

The disclosure provides a device of the above-mentioned type that has a simple and solid construction. Also to the disclosure treats the lens carefully when changing from a closed position to an open position and vice versa.

The disclosure provides that the lens cover is mounted so as to shift longitudinally and to rotate. Since the lens cover and the bearing shaft together form the cover unit, the lens cover is mounted so as to shift longitudinally and rotate through the bearing shaft itself. For this it is advantageous if the lens cover is constructed in one piece and/or as a material unit with the bearing shaft. In order to treat the lens securely and lightly as much as possible, the lens cover is first shifted laterally a minimum distance a from the lens and is then turned away at a predefined angle α, in order to clear the shooting area of the camera. The lateral shifting of the lens cover from its closed position I to an intermediate position III takes place essentially in the direction of the shooting of the camera. As the lens cover in this intermediate position III still looms in the shooting area of the camera unit, it must be turned out of this shooting area in order to enable picture taking outside of the motor vehicle. Optionally it is conceivable for the lens cover to be pulled opposite the direction of shooting on the device in order to enable the largest possible wide-angled shooting area for the camera unit.

As was already mentioned above, it can be provided that the lens cover is arranged rigidly on the bearing shaft. In this case it is conceivable for the lens cover to be connected tightly to the bearing shaft by means of a notch or screw connection. Thus, the lens cover can be arranged in essence orthogonally at a front end of the bearing shaft. The intention is that a fictively spread out surface of the lens cover is aligned in essence orthogonally to the axis of rotation of the bearing shaft. The cover unit then has an essentially L-shaped form wherein the vertical part of the "L" is formed by the bearing shaft and the horizontal part of the "L" is formed by the lens cover. Consequently, the cover unit itself is designed to be simple in construction. The whole cover unit can be in one piece and/or materially unified, however it is also conceivable for the bearing shaft to be made of a different material from the lens cover. Preferably, at least the lens cover is constructed from a corrosion resistant material, such as stainless steel, aluminum or plastic.

It is also conceivable for the lens cover to be movable from the closed position I first essentially in the shooting direction of the camera unit and then turned away. For this purpose the bearing shaft can first be made to shift axially in a guide sleeve, which is arranged on the device itself, and then the bearing shaft can be made to turn about a predefined angle α. As a result of this, the lens cover is first lifted or spaced at a minimum distance a from the objective or lens of the camera unit. By this process the lens cover can be removed safely from the objective without affecting or scratching the lens. The lens cover itself can have an opening for the objective or lens so that the lens cover does not touch the lens itself even in the closed position I. It is also conceivable for a cloth or cleaning element to be provided on an inner surface of the lens cover, which is directed toward the lens, so that it comes into contact lightly and with a cleaning function with the lens when the lens cover is securely in the closed position I. Basically at least one seal should be provided between the camera unit and cover unit, so that the lens cover in the closed position protects the lens even from sprayed water and the like. It is also conceivable for the seal between the lens cover and the camera unit to be fashioned as a labyrinth seal. Since the lens cover is shifted laterally at a parallel minimum distance a from the lens, the lens cover can then be turned at an angle α, so the lens cover itself does not loom in the shooting area of the camera unit. Further, it is conceivable for the lens cover to then be drawn in the opposite direction from the shooting direction, toward the camera unit, thereby reducing the previously resulting minimum distance a. It can thereby be ensured that the lens cover will not interfere with picture taking even with a very wide-angled shooting area. Additionally, the lens cover can stop at an opened position where it is situated in a secured position in which it is protected from mechanical influences as much as possible. For this purpose the device can provide a receiver or opening for the lens cover in its opened position II.

In order to enable the above-described movement of the lens cover, a slide guide can be provided on the back end of the bearing shaft opposite the lens cover, by which a defined change (as described above) can be executed from the closed position I to the opened position II and vice versa. This slide guide thus serves on one hand for the lateral shifting of the lens cover and on the other hand for the subsequent turning and the optional reverse lateral shifting of the lens cover. Of course, it is also conceivable for an adjusting mechanism that operates the lens cover in the desired manner to be provided in place of the slide guide. The slide guide, however, has an advantage over the adjusting mechanism since it has a simple construction and is reliable.

The above-mentioned slide guide can have at least one slide block on the bearing shaft as well as a first slide track on the guide sleeve, by which the slide block acts together with the first slide track in a form-fit manner. The slide block can be fashioned on the one hand as a cylindrical peg that is arranged in a hole, particularly in the form of a blind hole on the back end of the bearing shaft. This construction enables a simple assembly of the device of the invention, particularly the lens cover, since the cylindrical peg can be installed just after the pre-assembly of the cover unit on the device. Preferably, the cylindrical peg is clamped in the hole of the bearing shaft by a tight fit. On the other hand, it is conceivable for the slide block to be formed by a cylindrical cam that is arranged directly on the bearing shaft. Since the slide block is required for the operation of the cover unit, this must be tightly connected to the bearing shaft, wherein the slide block can be sprayed or cast on, for example.

At the back end of the bearing shaft a carrier, particularly in form of a lever, can attach, by which the cover unit itself can be driven in order to enable the desired sequence of motions. This carrier serves as a mechanical connecting piece between the drive and the cover unit. The drive may be an actuator, for example, particularly a linear actuator or a rotary actuator which engages directly or indirectly with the carrier via a bar, a Bowden cable, a gear wheel or a mechanical system. Since the carrier itself need only be swiveled or turned in a circle, a simple construction is likewise possible. If a bar or Bowden cable is used as the connector between the drive and the carrier, it is conceivable to fashion the drive detached as an additional part for the device of the invention. The options for deployment within a limited space can thereby be expanded. It is also conceivable to fall back on drives already existing in the motor vehicle, which could then serve additionally as a drive for the device or cover unit as well.

In the carrier a further, second slide track can be arranged, which also cooperates in a form-fit manner with the above-mentioned slide block on the bearing shaft, wherein, in particular, the carrier with a cylindrical section comprises the back end of the bearing shaft and the guide sleeve with the first slide track. Thus, the slide guide mentioned is formed by the slide block on the bearing shaft and the first slide track on the guide sleeve and the second slide track on the carrier. By this interaction of the parts of the slide guide the desired sequence of motions for the lens cover can be easily and securely realized. In this case, no other parts, e.g. spring elements or gear wheels, notches of the like, are required. To enable the carrier to activate the cover unit, it is provided that the carrier is arranged to be rotatable and axially immovable along the longitudinal axis of the bearing shaft on a rear section of the guide sleeve. For this purpose the carrier can be axially secured by a securing element, e.g. a snap ring or a retaining ring, on the rear section of the bearing shaft. Consequently, although the carrier is flexible in turning to the guide sleeve it is not laterally shiftable. Instead, a turning motion of the carrier is converted by the slide guide into a lateral shifting or turning motion of the lens cover or cover unit itself. The rear section of the guide sleeve can have a smaller outer diameter than the remaining outer diameter of the guide sleeve. The carrier itself can also have a cylindrical section with which it is set on the rear section of the guide sleeve. On the cylindrical section of the carrier a lever-shaped extension can be attached, on which the drive for the lens cover can engage.

In what follows, the principle of the slide guide will be described in greater detail. The cover unit is rotatable and laterally shiftable in the guide sleeve, for which purpose the guide sleeve has a continuous inside diameter that is somewhat larger than the outer diameter of the bearing shaft so that there is some play and smoothness in its placement in the guide sleeve. In order to provide the concrete sequence of motions for the cover unit, the first slide track is provided in the rear section of the guide sleeve. In the present case this made in the shape of a "U", by which it is clear that the lens cover is first shifted laterally without turning and is then turned without a lateral shift and then shifted toward the device without turning. In this, the vertical sides of the "U" serve to shift the lens cover laterally and the horizontal side of the "U"-shaped first slide track is used exclusively to turn the lens cover of the cover unit. Of course, a corresponding sequence of motions for the lens cover can be realized by another shape of the first slide guide. The cover unit itself is guided in the first slide track in a form-fit connection by means of the slide block. Thus, the first slide track does not allow any other sequence of motions for the lens cover. For an actual movement of the lens cover or cover unit to take place, the slide block looms out of the first slide track into the second slide track in the carrier. As a result, the second slide track in the carrier serves to guide the cover unit through the first slide track with the slide block. For this purpose, the second slide track can be made essentially V-shaped and has wedge-shaped or triangle-shaped sections to enable a raising of the slide block in the U-shaped first slide track, particularly in the vertical sections or flanks. The corresponding slide block is guided through the first slide track from the second slide track by an inner as well as an outer opening edge. It is also conceivable in another variant of the invention for the cover unit to be spring loaded axially in the guide sleeve, wherein the available spring force pushes the cover unit in the shooting direction of the camera. In this variant an inner, particularly V-shaped, opening edge can be dispensed with, as the spring force pushes the cover unit permanently in the shooting direction of the camera. Consequently, the outer opening edge acts against the spring force and pushes the cover unit back toward the device.

It can further be provided in the device of the invention that the camera unit is held immovable on or in the device and the cover unit is held movably beside the camera unit. Thus, only the cover unit or lens cover changes its position with the change from closed position I to opened position II. Since the device itself is arranged in an opening in the outer wall of the motor vehicle, especially on a part of the body, the device should close this opening, especially making it water-tight. For this purpose the device has a partition that separates the outside of the motor vehicle from the inside, wherein the camera unit and the cover unit extend through the partition so that both the camera unit and the cover unit are in direct contact with the outside of the motor vehicle. The entire device can be protected from further influences by an additional housing in the inner area or on the inside of the partition. The camera unit itself can be held on the partition by means of a mechanical receiver, wherein the receiver and/or guide sleeve, in particular, can be made in one piece and/or materially uniform with the partition. On the partition itself notches or retainers can be provided for fastening it in the opening of the motor vehicle. It is also conceivable for the drive to comprise an activating unit for opening and/or closing a lid on the motor vehicle, wherein the activating unit has at least one manually operable activating element. This activating element can be, for example, a mechanical or electric sensor, switch or lever. The activating element itself can also be arranged to be pushed through the partition so that it is operable from the outer area of the motor vehicle.

The camera unit itself can be held form-fit in the receiver by an additional holding means, such as a clip or a clamp. It is also conceivable for the guide sleeve to be connected to the partition by threading, so that a two or more part version of these parts is feasibly realized.

It is also a problem of the device of the disclosure to provide a corresponding activating method for a device with a camera unit in accordance with the overriding concept of claim 13, which will enable a secure and reliable operation of the lens cover in a simple manner.

To solve this problem, a method having the features of claim 13, especially from the characterizing portion, is proposed.

The invention thus provides that the method carries out the following steps in order to transfer the lens cover from the closed position I to the opened position II:
a) the lens cover is shifted laterally in the shooting direction at a minimum distance
b) then the lens cover is turned away at a predefined angle α in order to clear the lens.

We would note for step a) that the lens cover is moved in essence parallel to the lens by the lateral shift in order to avoid damaging the objective or lens by the movement of the lens cover. It is also conceivable for step b) to be executed simultaneously after the start of step a), wherein step a) must first lift the lens cover safely from the lens. With this combined simultaneous motion of step a) and b) a shorter amount of time for the change between the closed position and the opened position can be achieved.

Further advantageous embodiments of the method of activation for a device with a camera unit are presented in the dependent method claims.

For instance, it is conceivable for the following step to be carried out after step b):
c) the lens cover is shifted laterally or drawn against the shooting direction toward the device.

In this manner, the shooting area of the lens can be enlarged since the lens cover is more tightly arranged on the device in its opened position. It is also conceivable for the lens cover to be immovable in relation to the bearing shaft and exclusively operated by it during the change from the closed position I to the opened position II and vice versa. As a result, the lens cover has no relative movement to the bearing shaft so that the lens cover and the bearing shaft can form the cover unit themselves.

BRIEF DESCRIPTION OF THE DRAWINGS

Further advantages, features and details of the invention emerge from the following specifications in which two exemplary embodiments of the invention are described in detail with reference to the drawings. The technical features mentioned in the claims and the specification can give the essence of the invention either separately or in any combination. The drawings are:

DETAILED DESCRIPTION

Figure 1:
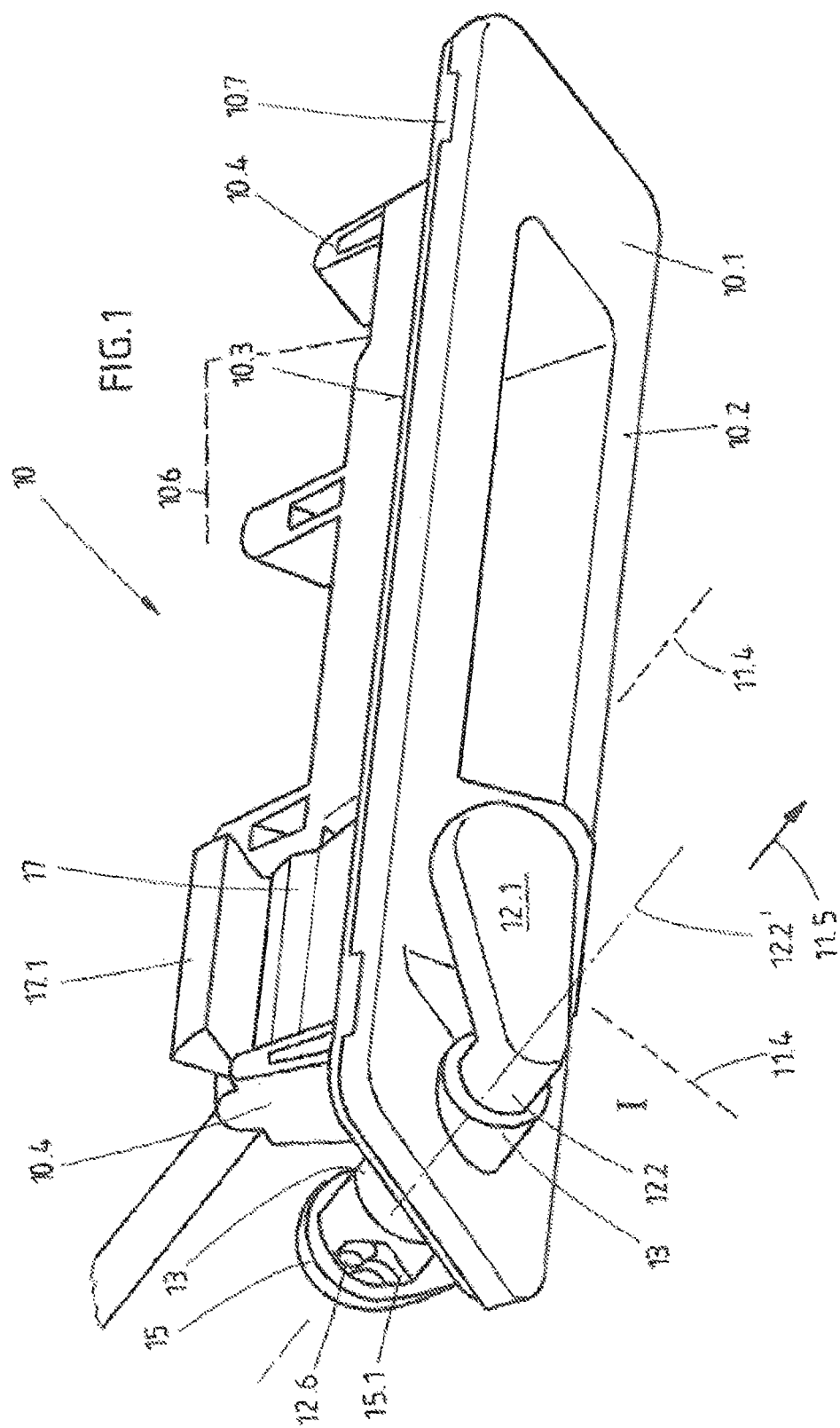
FIG. 1 three-dimensional view of the device of the invention in a closed position I, FIG. 2 section of the device of the invention from FIG. 1, wherein a cover unit is shifted laterally in an intermediate position III, FIG. 3 comparable section from FIG. 2, wherein the cover unit is now turned at an angle, FIG. 4 comparable section from FIG. 3, wherein the cover unit is now pulled toward the shooting direction on the device, FIG. 5 three-dimensional blow-up of the device of the invention, FIG. 6a three-dimensional view of the mechanical interaction of the cover unit with the guide sleeve and a carrier in the closed position I, FIG. 6b comparable to FIG. 6a but with the cover unit in an intermediate position III and FIG. 6c comparable to FIGS. 6a and b, wherein the cover unit is in the opened position II.

In FIG. 1 a first embodiment of the device 10 of the invention is represented in a three-dimensional view. Herein the device 10 is shown mainly from the point of view of the outside of a vehicle, which can be a motor vehicle. The device 10 itself comprises a camera unit 12 that is fixed in a receiver 17 by a clip-like holding means 17.1 on the device 10 in a form-fit manner. From the camera unit 11 an electrical cable extends (in the present case upward to the left) over a connector 11.3. In FIG. 1 the lens 11.1 of the camera unit 11 is not visible as it is hidden by a cover unit 12, particularly a lens cover 12.1, which is in the closed position I. The cover unit 12 itself is arranged next to the camera unit 11 (here to the left). The cover unit 12 is mounted or received in the device 10 so as to be rotatable or laterally shiftable by means of a guide sleeve 13. In the present case, the guide sleeve 13 is fashioned in one piece with the partition 10.1 of the device 10 exactly like receiver 17. Preferably, this kind of partition 10.1 is made of injection-molded plastic. The whole device 10 is placed on a motor vehicle in an opening, particularly in a part of the body, and closes this opening. For this purpose a sealing groove 10.5 is provided on the inside 10.3 of the partition 10.1 in which a seal 10.7 can be placed. The opening in the vehicle is closed by this seal 10.7 against outside environmental influences, i.e. protected from water and dirt. The camera unit 11 and the cover unit 12 extend through the partition 10 in such a way that the lens 11.1 and the lens cover 12.1 are arranged in the outer area of the device 10, whereas the camera body 11.2 and the remaining part of the cover unit 12, which also includes the bearing shaft 12.2, are located in the inner area of the device 10. On the outside 10.2 of the partition 10.1—in the present case—there is an activating unit 18 (right) beside the camera unit 11. The activating unit 18 itself has a meshing hollow that is formed in the partition 10.1 in order to access a manually operable activation element of the activating unit 18 from the outside. The whole device 10 can be locked and held in the opening in the vehicle via notch means 10.4 that are arranged on the inside 10.3 of the device 10.

The device 10 can be sealed off on the inside 10.3 of the partition 10.1 with an optional housing 10.6. In FIG. 1 this housing 10.6 is represented by a hatched in extension.

So that the camera unit 11 can be used to take pictures, the cover unit 12 or the lens cover 12.1 must be transferred from its closed position I to an opened position II, particularly via an intermediate position III. For this purpose a carrier 15 is arranged on the rear end 12.3 of the cover unit 12, which ensures the operation of the lens cover 12.1. The change of the lens cover 12.1 from its closed position I to its opened position II is represented and described in more detail in FIGS. 2 to 4.

Figure 5:
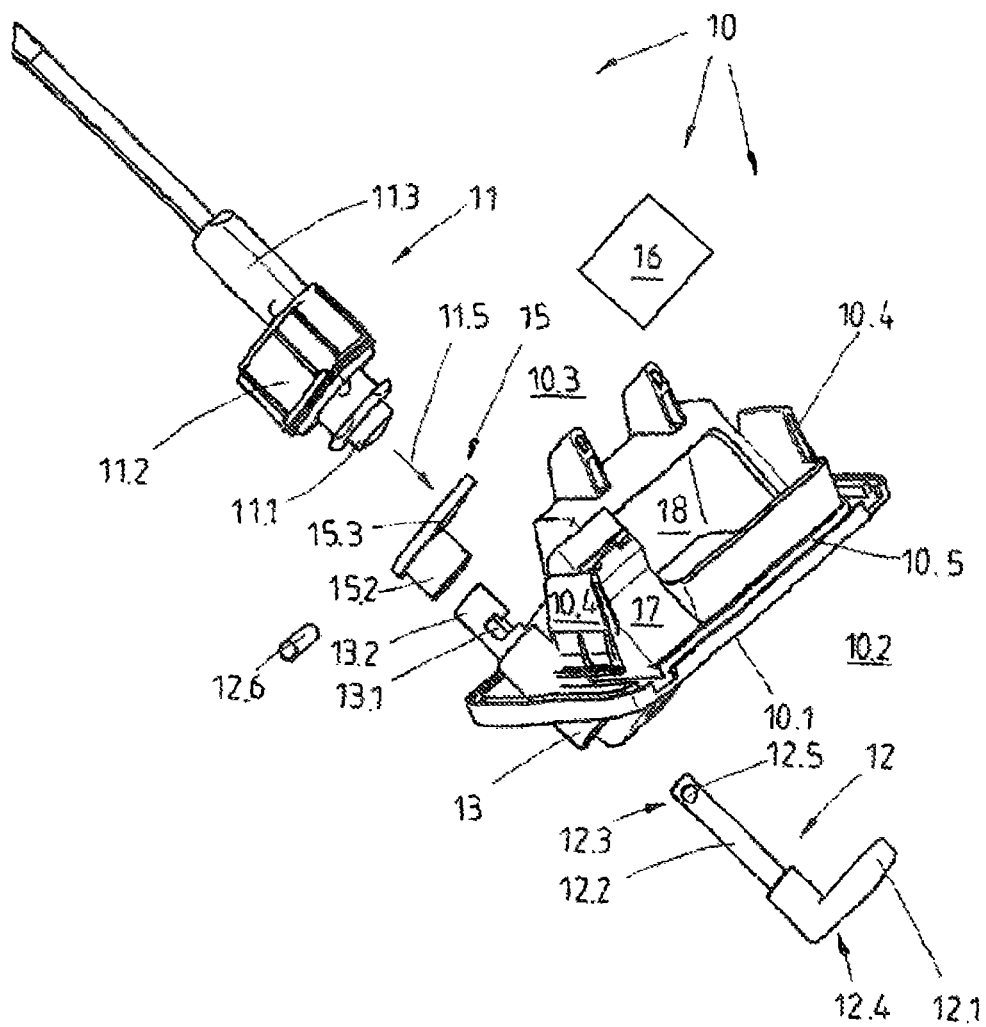

A section from FIG. 1 is shown in FIG. 2, wherein in this case the cover unit 12 essential to the invention is visible. In contrast to FIG. 1 the carrier 15 is turned clockwise about the longitudinal axis 12.2' of the bearing shaft 12.2. This results in a lateral movement 19 of the whole cover unit 12 in the shooting direction 11.5 of the camera unit 11. By this lateral movement 19 the lens cover 12.1 is lifted at a parallel minimum distance a from the lens 11.1. The required movement for this is produced by a slide guide 14. Thus, the turning motion of the carrier 15 is converted into a lifting motion or lateral shifting of the cover unit 12. For this purpose, a second slide track 15.1 is arranged in a cylindrical section 15.2 in the carrier 15. In this second slide track 15.1 a slide block 12.6 looms, which is fastened tightly with the bearing shaft 12.2, particularly on a rear end 12.3 of the bearing shaft 12.2. The slide block 12.6, in the present case, comprises a cylindrical peg 12.6 that is arranged in a radial hole 12.5 in the bearing shaft 12.2. The hole 12.5, in the present case, comprises a blind hole that does not fully radially pass through the bearing shaft 12.2. Thus, the peg 12.5 extends only on one side radially out of the bearing shaft 12.2 in order to interact in a form-fitting fashion with a first slide track 13.1 in the guide sleeve 13 and a second slide track 15.1 in the carrier 15. The first slide track 13.1 is not represented in FIGS. 1 to 4 since this is more or less completely covered by the carrier 15, particularly the cylindrical section 15.2. The carrier 15 sits with its cylindrical section 15.2 rotatable on a back section 13.2 of the guide sleeve 13, however the carrier 15 itself is axially secured on the guide sleeve 13. In the present case, the back section 13.2 of the guide sleeve 13 is tapered for this reason in order thus to accommodate the carrier 15. The carrier 15 has a lever-shaped attachment 15.3 beside its cylindrical section 15.2, by which it interacts mechanically, directly or indirectly, with a drive 16, which is schematically represented in FIG. 5. The carrier 15 is turned on the back section 13.2 of the guide sleeve 13 by this lever-shaped attachment 15.3. This turning motion is converted to the sequence of motions of the cover unit 12 by the slide guide 14.

Figure 6A:
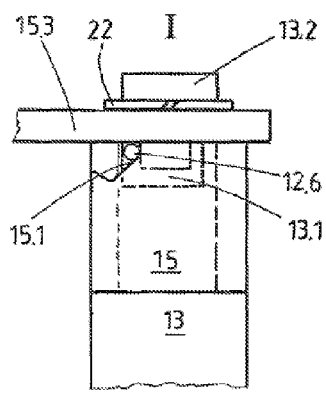
Figure 6B:
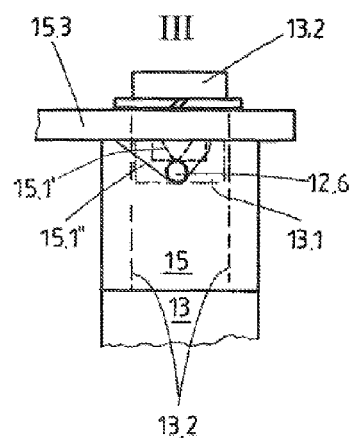
Figure 6C:
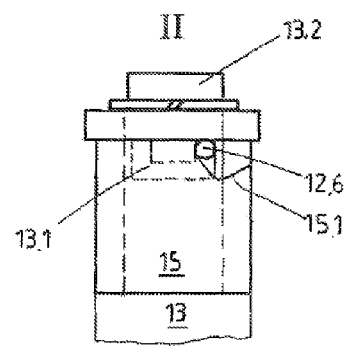

In FIG. 3, which corresponds essentially to FIG. 2, the lens cover 12.1 is additionally turned about an angle α. Thus, the objective 11.1 or lens 11.1 of the camera unit 11 is now also visible. The carrier 15 has been turned further clockwise for this purpose in order to turn the lens cover 12.1 in its pulled out position about the angle α 21. The actual sequence of motions for the cover unit 12 is provided by the first slide track 13.1, which is represented in more detail in FIGS. 6a to 6c. This first slide track is made in the form of a "U" so that the cover unit 12 is first laterally shifted, then enables a turn about the predefined angle α 21 and is finally pulled back, i.e. opposite the shooting direction 11.5, in order to reach the desired opened position II. In FIG. 3, however, the lens cover 12.1 is still represented in an intermediate position III. So that the slide block 12.6 of the provided first slide track 13.1 can follow, this is shifted through the second slide track 15.1 in the carrier 15. This serves to allow an inner edge 15.1' of the second slide track 15.1 to lift or shift laterally the cover unit 12 in the shooting direction 11.5, while an outer edge 15.1" of the second slide track 15.1 serves to allow the turning 20 of the cover unit 12 and the lowering of the cover unit 12 in the direction opposite the shooting direction 11.5. Both the inner and outer edges 15.1', 15.1" are made essentially to be in the shape of a "V". This configuration of the second slide track 15.1 makes it possible to dispense with a spring element for the lateral shifting of the lens cover 12.1 or cover unit 12. In FIGS. 6a to 6c the second slide track 15.1 is formed differently since a corresponding spring element is used.

In FIG. 4 the comparable section from FIGS. 2 and 3 is shown again, however here the lens cover 12.1 has reached its closed position II. In this closed position II the lens cover 12.1 is drawn toward the device 10 and thus in the opposite direction to the shooting direction 11.5 and so the minimum distance a, previously produced by the lateral lift of the cover unit 12, is again reduced. It is also conceivable for the lens cover 12.1 to be arranged in a receiver inside the device 10 in a park position. In the opened position 2 represented here, a large or wide-angle shooting area 11.4 is possible for the camera unit 11. The carrier 15 has reached a maximum displacement in the opened position II so that the slide block 12.6 is now arranged on the edge of the lever-shaped attachment 15.3 in the second slide track 15.1. In order to move the lens cover 12.1 out of its opened position II into its closed position I, the slide block 12.6 on the inner edge 15.1' of the slide track 15.1 is pushed high in the vertical section or side of the U-shaped first slide track 13.1. Finally the reverse sequence of motions, as already described above, takes place until the lens cover 12.1 reaches its closed position I again.

In FIG. 5 the device 10 of the invention is represented in a three-dimensional blow-up. As is apparent, the camera unit 11 as an independent part is not yet fixed in the receiver 17 provided on the device 10. Likewise, the cover unit 12 is not yet placed in the guide sleeve 13 and connected with the carrier 15. As is clear from FIG. 5, the cover unit 12 has an L-shaped formation. The vertical section of the "L" is formed by the bearing shaft 12.2, to which the lens cover 12.1 is connected as the horizontal section of the "L" on the front end 12.4. The bearing shaft 12.2 can be made in one piece with the lens cover 12.1. It is also conceivable for the bearing shaft 12.2 to be, for example, screwed into the lens cover 12.1 as a separate part. On the rear end 12.3 of the bearing shaft 12.2 the slide block 12.6 is arranged in a radial protrusion. This slide block 12.6, in the present case, comprises a peg 12.6 that is embedded in a hole 12.5 in the bearing shaft 12.2. The hole 12.5 itself need not penetrate the bearing shaft 12.2 completely. The peg 12.6 is fixed in the hole 12.5 so as to be as captive as possible, e.g. by a driving fit or by a glue or screw connection. Preferably the peg 12.6 is installed in the guide sleeve 13 only after a premounting of the cover unit 12. Then the carrier 15 with its cylindrical section 15.2 can also be premounted ahead of time across the back section 13.2 of the guide sleeve 13.

In FIGS. 6a to 6c the mechanical interaction of the slide block 12.6 with the first slide track 13.1 and the second slide track 15.1, which together form the slide guide 14, is represented. In FIG. 6a the opened position I of the cover unit 12 is represented. In the embodiment variant from FIGS. 6a to 6c the cover unit 12 is axially spring-loaded. Thus the spring element, which is not pictured, pushes the bearing shaft 12.2 axially out of the device 10 into the shooting direction 11.5. Consequently the slide block 12.6 is steadily engaged to go as far as possible in the shooting direction 11.5, i.e. downwards in the present case. In FIG. 6a first the slide block 12.6 lies above in the left vertical section of the U-shaped first slide track 13.1. In this, the slide block 12.6 can touch the upper end of the first slide track 13.1, since this is pushed by the second slide track 15.1 against the spring action. If the carrier 15 is now turned clockwise by its lever-shaped attachment 15.3, then the slide block 12.6 follows the outer edge 15.1" of the second slide track 15.1 because of the present spring action. Thus the slide block 12.6 also passes through the left vertical section of the U-shaped first slide track 13.1, resulting in a lateral shift 19 of the cover unit 12. In spite of the turning of the carrier 15, however, the lens cover 12.1 is not yet turned since the slide block 12.6 first must reach the horizontal section of the "U" of the first slide track 13.1.

In FIG. 6b the intermediate position III of the lens cover 12.1 or cover unit 12 is represented. In this intermediate position III the lens cover 12.1 has already been turned nearly half of the angle α 21, which means that the slide block 12.6 has passed through half of the horizontal section of the U-shaped first slide track 13.1. So that the cover unit 12 can be turned the full angle α, the left flank of the V-shaped outer edge 15.1" of the second slide track 15.1 now pushes the slide block 12.6 to the right in the horizontal section of the U-shaped slide track 13.1. As soon as the slide block 12.6 hits the right edge of the U-shaped slide track 13.1, further turning of the cover unit 12 is no longer possible. In this position the lens cover 12.1 can only still be pulled opposite the shooting direction 11.5 toward the device 10. In this case as well, the left outer edge 15.1" of the V-shaped second slide track 15.1 serves to guide the slide block 12.6 inside the right vertical U-shaped section of the first slide track 13.1.

In FIG. 6c the lens cover 12.1 is represented in its opened position II. In this case the lens cover 12.1 has been guided toward the device 10 opposite the shooting direction 11.5 by the right vertical guide flank of the U-shaped first slide track 13.1. So that the slide block 12.6 will pass through the right vertical guide flank against the spring action, it is pushed by the second slide track 15.1. The left V-shaped section of the outer edge 15.1" then ensures the corresponding movement of the slide block 12.6.

At this point it should be mentioned that the upper end of the U-shaped first slide track 13.1 must not end at the same height, whereby an axial distance of the lens cover 12.1 is present from its closed position I to the opened position II. In FIG. 6b the inner edge 15.1' for the second slide track 15.1 is also indicated by hatch marks and serves to push the slide block 12.6 in the shooting direction 11.5, if no spring element is provided for this purpose. It is also conceivable to design a combination for an embodiment and provide the spring element as well as the inner edge 15.1' of the second slide track 15.1 for the lateral shift 19 of the bearing shaft 12.2 or the cover unit 12. In addition, other combinations of the above-described features can be designed as long as these are not mutually exclusive.

The invention claimed is:

1. A device with a camera unit that has a lens for taking pictures of the area outside a motor vehicle and a cover unit that can change by means of a drive from a closed position to an open position and vice versa, wherein the cover unit covers the lens of the camera unit in the closed position and uncovers the lens in the open position making it possible to take a picture, and wherein the cover unit has a lens cover wherein only one side of the lens cover is attached to the device by means of a bearing shaft so as to be movable, wherein the lens cover is mounted so as to be longitudinally shifting and rotatable.

2. The device of claim 1 wherein the lens cover is arranged rigidly on the bearing shaft, essentially orthogonal on a front end of the bearing shaft.

3. The device of claim 1 wherein the lens cover is first movable from the closed position in a shooting direction of the camera unit and is then arranged so as to turn away, for which purpose especially the bearing shaft in a guide sleeve, which is arranged on the device, can first be axially shifted and then the bearing shaft can be rotated at a predefined angle.

4. The device of claim 1 wherein the bearing shaft is provided with a slide sleeve on the back end opposite the lens cover by which a defined change from the closed position to the open position and vice versa is made possible.

5. The device of claim 4 wherein the slide sleeve has at least one slide block on the bearing shaft as well as a first slide track on the guide sleeve, wherein the slide block acts together with the first slide track in a form-fit manner, wherein the slide block is fashioned as a cylindrical peg that is arranged in a hole on the back end of the bearing shaft.

6. The device of claim 1 wherein a carrier in the form of a lever grips at a back end of the bearing shaft whereby the cover unit can be driven.

7. The device of claim 6 wherein the carrier is operable by a drive, wherein the drive has a linear actuator or a rotary drive that engages with the carrier directly or indirectly via a bar, a Bowden cable, a gear wheel or mechanical system.

8. The device of claim 5 wherein a further second slide track is arranged in a carrier and also interacts in a form-fit manner with the slide block on the bearing shaft, wherein the carrier with a cylindrical section comprises a back end of the bearing shaft and the guide sleeve with the first slide block.

9. The device of claim 8 wherein the carrier is arranged to be rotatable and axially unshiftable relative to a longitudinal axis of the bearing shaft on a back section of the guide sleeve.

10. The device of claim 1 wherein the camera unit is held immovable on or in the device and the cover unit is movable sideways next to the camera unit, wherein the device has a partition that separates an outside of the motor vehicle from an inside and the camera unit and the cover unit extend through the partition.

11. The device of claim 10 wherein the camera unit is held on the partition by means of a mechanical receiver, wherein the receiver and/or the guide sleeve are fashioned as one piece and/or materially uniform with the partition.

12. The device of claim 1 further comprising an activation unit for opening and/or closing activation of a lid on the motor vehicle, wherein the activation unit has at least one manually operable activation element that is arranged pushing through a partition.

13. An operating procedure for a device with a camera unit that has a lens for taking pictures of an area outside a motor vehicle and a cover unit that can change by means of a drive from a closed position to an open position and vice versa, wherein the cover unit covers the lens of the camera unit in the closed position and uncovers the lens in the open position making it possible to take a picture, and wherein the cover unit has a lens cover that is movable on one side by means of a bearing shaft on the device, wherein the following steps are carried out in order to transfer the lens cover from the closed position to the open position:
   a) the lens cover is only longitudinally shifted in a shooting direction at a minimum distance
   b) then the lens cover turns away at a predefined angle in order to clear the lens.

14. An operational procedure for a device of claim 13 wherein after step b) the following step is carried out:
   c) the lens cover is longitudinally shifted or advanced against the shooting direction toward the device.

15. An operational procedure for a device of claim 13 wherein the lens cover is immovable in relation to the bearing shaft and is exclusively operated by it when changing from the open position to the closed position and vice versa.

* * * * *